US010684351B2

United States Patent
Xue et al.

(10) Patent No.: US 10,684,351 B2
(45) Date of Patent: Jun. 16, 2020

(54) TERMINAL DEVICE AND POSITIONING SYSTEM

(71) Applicant: HUAWEI TECHNOLOGIES CO., LTD., Shenzhen, Guangdong (CN)

(72) Inventors: Jiantao Xue, Beijing (CN); Anjian Li, Beijing (CN); Bin Su, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 44 days.

(21) Appl. No.: 16/022,495

(22) Filed: Jun. 28, 2018

(65) Prior Publication Data

US 2018/0306896 A1    Oct. 25, 2018

Related U.S. Application Data

(63) Continuation of application No. PCT/CN2015/100320, filed on Dec. 31, 2015.

(51) Int. Cl.
  *G01S 5/10*  (2006.01)
  *H04W 64/00*  (2009.01)
  (Continued)

(52) U.S. Cl.
  CPC .............. *G01S 5/10* (2013.01); *H04B 7/0613* (2013.01); *H04L 1/0026* (2013.01);
  (Continued)

(58) Field of Classification Search
  None
  See application file for complete search history.

(56) References Cited

U.S. PATENT DOCUMENTS 6,230,018 B1 * 5/2001 Watters ............... G01S 5/02
                                                         340/988
2005/0185618 A1 * 8/2005 Friday .............. G01S 5/0252
                                                         370/331
(Continued)

FOREIGN PATENT DOCUMENTS

CN      1491064 A    4/2004
CN    102577486 A    7/2012
(Continued)

OTHER PUBLICATIONS

3GPP TR 37.857 V13.1.0 (Dec. 2015),3rd Generation Partnership Project;Technical Specification Group Radio Access Network;Study on indoor positioning enhancements for UTRA and LTE(Release 13),total 82 pages.
(Continued)

*Primary Examiner* — Brian S Roberts
(74) *Attorney, Agent, or Firm* — Womble Bond Dickinson (US) LLP

(57) ABSTRACT

Embodiments of the present invention provide a terminal device and a positioning system, and relate to the field of communications technologies. The terminal device is configured to: obtain identifiers of at least two antenna elements and attribute information of a reference signal corresponding to each of the at least two antenna elements; receive at least two reference signals based on the attribute information, where the at least two reference signals are sent by corresponding antenna elements of the at least two antenna elements, respectively; obtain positioning information; and send, to the network device, the positioning information and identification information of antenna elements corresponding to the positioning information. Positioning signals obtained by different antenna elements are different, so that the terminal device can identify which antenna element a received positioning signal comes from. Therefore, an
(Continued)

improved distributed antenna system can implement terminal device positioning, and improve indoor positioning accuracy.

3 Claims, 9 Drawing Sheets

(51) Int. Cl.
*H04B 7/06* (2006.01)
*H04L 1/00* (2006.01)
*G01S 5/02* (2010.01)
*G01S 5/00* (2006.01)

(52) U.S. Cl.
CPC ......... *H04W 64/00* (2013.01); *H04W 64/003* (2013.01); *G01S 5/0036* (2013.01); *G01S 5/0226* (2013.01)

(56) References Cited

U.S. PATENT DOCUMENTS

| | | | |
|---|---|---|---|
| 2006/0128399 A1 | 6/2006 | Duan et al. | |
| 2007/0082677 A1* | 4/2007 | Donald Hart | H04B 17/318 455/456.1 |
| 2010/0008337 A1 | 1/2010 | Bajko | |
| 2010/0120447 A1* | 5/2010 | Anderson | H04W 64/003 455/456.1 |
| 2011/0105144 A1 | 5/2011 | Siomina et al. | |
| 2012/0165038 A1* | 6/2012 | Soma | G01S 5/08 455/456.1 |
| 2012/0213111 A1 | 8/2012 | Shimezawa et al. | |
| 2013/0294402 A1 | 11/2013 | Yoon | |
| 2013/0336224 A1 | 12/2013 | Davydov et al. | |
| 2014/0176366 A1 | 6/2014 | Fischer et al. | |
| 2018/0054750 A1* | 2/2018 | Lee | G01S 5/0236 |
| 2018/0067187 A1* | 3/2018 | Oh | H04W 64/00 |

FOREIGN PATENT DOCUMENTS

| | | |
|---|---|---|
| CN | 102725649 A | 10/2012 |
| CN | 102736062 A | 10/2012 |
| CN | 103703385 A | 4/2014 |
| EP | 2747498 A1 | 6/2014 |
| EP | 2775744 A1 | 9/2014 |
| JP | 2008193526 A | 8/2008 |
| JP | 2010011068 A | 1/2010 |
| WO | 02060076 A1 | 8/2002 |
| WO | 2014105324 A1 | 7/2014 |

OTHER PUBLICATIONS

Sven Fischer,"Observed Time Difference of Arrival (OTDOA) Positioning in 3GPP LTE",Qualcomm Technologies Inc,dated Jun. 6, 2014,total 62 pages.

* cited by examiner

TERMINAL DEVICE AND POSITIONING SYSTEM

CROSS-REFERENCE TO RELATED APPLICATIONS

This application is a continuation of International Application No. PCT/CN2015/100320, filed on Dec. 31, 2015, the disclosure of which is hereby incorporated by reference in its entirety.

TECHNICAL FIELD

The present invention relates to the field of wireless communications technologies, and in particular, to a terminal device and a positioning system.

BACKGROUND

As communications technologies and communications services develop, location services are playing an important role as an indispensable part of mobile communications and personal communications services. An accurate and efficient positioning method is required for all location services based on a location of a mobile terminal, for example, intelligent traffic, vehicle navigation, traveling guidance, emergency alarming, and network planning and optimization. However, the currently widely used Global Positioning System (GPS) positioning technology cannot implement indoor positioning because no satellite signal is received indoors or a signal received indoors is excessively weak. Some indoor positioning technologies, for example, indoor positioning technologies based on a wireless local area network, Bluetooth, and the like, can implement indoor positioning, but require installation of massive third-party devices. This not only leads to high installation and maintenance costs, but also results in unstable system performance due to great environmental impact. At present, with popularization of smartphones, using a mobile telecommunications network to perform indoor positioning has become a popular positioning approach.

A frequently used positioning method based on a mobile telecommunications network is the observed time difference of arrival (OTDOA) technology. In a positioning process of this positioning method, after receiving different positioning reference signals (PRS) sent by a plurality of base stations, a terminal device calculates a time difference between each two received PRSs, to obtain a plurality of time differences, and sends, to a positioning server, the plurality of time differences and a base station identifier corresponding to each of the time differences. For each time difference and a base station identifier corresponding to the time difference, the positioning server calculates a hyperbolic positioning area based on the time difference and a base station location corresponding to the base station identifier, to finally obtain a plurality of hyperbolic positioning areas. Then, location information of the terminal device is obtained by calculating an intersection point of the plurality of hyperbolic positioning areas.

The described positioning method however is subject to at least the following problem:

In the positioning process, a node participating in positioning is a macro base station. For an indoor environment, due to impact of a propagation environment such as a multipath environment or a non line of sight (NLOS) environment, quality of a signal received by a terminal device is weak, or even no signal is received. As a result, accurate positioning cannot be implemented, and therefore positioning accuracy is poor.

SUMMARY

Embodiments of the present invention provide a terminal device and a positioning system.

According to a first aspect, a terminal device is provided, where the terminal device includes a receiver, a transmitter, a processor, and a memory; the receiver, the transmitter, and the memory are separately coupled to the processor; and the processor is configured to:

obtain, based on auxiliary data configured by a network device, identifiers of at least two antenna elements and attribute information of a reference signal corresponding to each of the at least two antenna elements; receive at least two reference signals based on the attribute information, where the at least two reference signals are sent by corresponding antenna elements of the at least two antenna elements, respectively; obtain positioning information by measuring the at least two reference signals; and send, to the network device, the positioning information and identification information of antenna elements corresponding to the positioning information. The terminal device can identify which antenna element a received reference signal comes from. Therefore, an improved distributed antenna system can implement terminal device positioning, and improve indoor positioning accuracy.

In one embodiment, the positioning information includes a time difference of arrival, and the processor is configured to obtain a time difference of arrival between reference signals sent by each two antenna elements, of the at least two reference signals. Because the terminal device can identify an antenna element that sends each reference signal, the observed time difference of arrival positioning method can be applied to a distributed positioning system, to implement indoor positioning.

In one embodiment, the processor is configured to receive the auxiliary data sent by the network device. Because the reference signals sent by the antenna elements can be distinguished between each other based on the auxiliary data, indoor positioning can be implemented.

According to a second aspect, a positioning information sending apparatus is provided, where the apparatus includes:

an obtaining module, configured to obtain, based on auxiliary data configured by a network device, identifiers of at least two antenna elements and attribute information of a reference signal corresponding to each of the at least two antenna elements; a receiving module, configured to receive at least two reference signals based on the attribute information, where the at least two reference signals are sent by corresponding antenna elements of the at least two antenna elements, respectively; a measurement module, configured to obtain positioning information by measuring the at least two reference signals; and a sending module, configured to send, to the network device, the positioning information and identification information of antenna elements corresponding to the positioning information. A terminal device can identify which antenna element a received reference signal comes from. Therefore, an improved distributed antenna system can implement terminal device positioning, and improve indoor positioning accuracy.

In one embodiment, the positioning information includes a time difference of arrival, and the measurement module is configured to obtain a time difference of arrival between reference signals sent by each two antenna elements, of the at least two reference signals. Because the terminal device can identify an antenna element that sends each reference signal, the observed time difference of arrival positioning method can be applied to a distributed positioning system, to implement indoor positioning.

In one embodiment, the receiving module is further configured to receive the auxiliary data sent by the network device. Because the reference signals sent by the antenna elements can be distinguished between each other based on the auxiliary data, indoor positioning can be implemented.

According to a third aspect, a network device is provided, where the network device includes a receiver, a transmitter, a processor, and a memory, the receiver, the transmitter, and the memory are separately coupled to the processor, and the processor is configured to generate a specified quantity of reference signals, where each reference signal has different attribute information; and the network device further includes a frequency conversion module and a local oscillator module, where the local oscillator module is connected to the frequency conversion module, and the frequency conversion module is connected to the transmitter; and the frequency conversion module is configured to respectively convert, based on different local frequencies generated by the local oscillator module, carrier frequencies of the generated specified quantity of reference signals to different carrier frequencies, where the specified quantity of reference signals are sent through the transmitter to a specified quantity of antenna elements. The network device uses a frequency domain separation approach to allocate reference signals having different attribute information to different antenna elements, so that a terminal device can identify which antenna element a received reference signal comes from. Therefore, an improved distributed antenna system can implement terminal device positioning, and improve indoor positioning accuracy.

According to a fourth aspect, a network device is provided, where the network device includes a receiver, a transmitter, a processor, and a memory, the receiver, the transmitter, and the memory are separately coupled to the processor, and the processor is configured to: obtain a specified quantity of scrambling codes, and generate a specified quantity of reference signals, where each reference signal is scrambled by a different scrambling code, and each reference signal has different attribute information; and the network device further includes a scrambling module and a scrambling code generation module, where the scrambling module is coupled to the scrambling code generation module, and the scrambling module is coupled to the transmitter; the scrambling code generation module is configured to generate a specified quantity of scrambling codes; and the scrambling module is configured to generate a specified quantity of reference signals, where each reference signal is scrambled by a different scrambling code, and the specified quantity of reference signals are sent through the transmitter to a specified quantity of antenna elements. The network device uses a code domain separation approach to allocate different reference signals to different antenna elements, so that a terminal device can identify which antenna element a received reference signal comes from. Therefore, an improved distributed antenna system can implement terminal device positioning, and improve indoor positioning accuracy.

According to a fifth aspect, a positioning system is provided, where the system includes a network device and a plurality of antenna elements; the network device is configured to: generate a plurality of reference signals, respectively convert carrier frequencies of the plurality of reference signals to different carrier frequencies, and send the plurality of reference signals to the plurality of antenna elements, where each reference signal has different attribute information; and each of the plurality of antenna elements is configured to: perform, after receiving the plurality of reference signals sent by the network device, frequency mixing processing on a reference signal carried on a carrier frequency corresponding to the antenna element, to obtain a specified reference signal; and send the specified reference signal to a terminal device. Reference signals obtained by different antenna elements are different, so that the terminal device can identify which antenna element a received reference signal comes from. Therefore, an improved distributed antenna system can implement terminal device positioning, and improve indoor positioning accuracy.

In one embodiment, each antenna element is further configured to: perform, after obtaining the specified reference signal, polarization processing on the specified reference signal using a specified polarization type; and send the polarized specified reference signal to the terminal device. Different antenna elements may polarize reference signals using different polarization types. Therefore, the terminal device can recognize, based on a polarization type of a reference signal, an antenna element that sends the reference signal. In this way, positioning accuracy is improved.

According to a sixth aspect, a positioning system is provided, where the system includes a network device and a plurality of antenna elements; the network device is configured to: obtain a specified quantity of scrambling codes, and generate a plurality of reference signals, where each reference signal is scrambled by a different scrambling code, and each reference signal has different attribute information; and send the plurality of reference signals to the plurality of antenna elements; and each of the plurality of antenna elements is configured to: perform, after receiving the plurality of reference signals, descrambling processing on a reference signal corresponding to a scrambling code of the antenna element, to obtain a specified reference signal; and send the specified reference signal to a terminal device. Reference signals obtained by different antenna elements are different, so that the terminal device can identify which antenna element a received positioning signal comes from. Therefore, an improved distributed antenna system can implement terminal device positioning, and improve indoor positioning accuracy.

In one embodiment, each antenna element is further configured to: perform, after obtaining the specified reference signal, polarization processing on the specified reference signal using a specified polarization type; and send the polarized specified reference signal to the terminal device. Different antenna elements may polarize reference signals using different polarization types. Therefore, the terminal device can recognize, based on a polarization type of a reference signal, an antenna element that sends the reference signal. In this way, positioning accuracy is improved.

According to a seventh aspect, a positioning system is provided, where the system includes a network device and a plurality of antenna elements; the network device is configured to: generate a reference signal, and send the reference signal to the plurality of antenna elements; and each of the plurality of antenna elements is configured to: perform, after receiving the reference signal, polarization processing on the reference signal using a specified polarization type, to obtain a plurality of reference signals of different polarization types; and send the plurality of reference signals to a terminal device. Different antenna elements may use different polarization types to polarize the reference signal, so that the terminal device can tell, based on a polarization type, which antenna element a received reference signal comes from. Therefore, an improved distributed antenna system can implement terminal device positioning, and improve indoor positioning accuracy.

According to an eighth aspect, a positioning information sending method is provided, where the method includes:

obtaining, based on auxiliary data configured by a network device, identifiers of at least two antenna elements and attribute information of a reference signal corresponding to each of the at least two antenna elements; receiving at least two reference signals based on the attribute information, where the at least two reference signals are sent by corresponding antenna elements of the at least two antenna elements, respectively; obtaining positioning information by measuring the at least two reference signals; and sending, to the network device, the positioning information and identification information of antenna elements corresponding to the positioning information. A terminal device can identify which antenna element a received reference signal comes from. Therefore, an improved distributed antenna system can implement terminal device positioning, and improve indoor positioning accuracy.

In one embodiment, the positioning information includes a time difference of arrival, and the method further includes:

obtaining a time difference of arrival between reference signals sent by each two antenna elements, of the at least two reference signals. Because the terminal device can identify an antenna element that sends each reference signal, the observed time difference of arrival positioning method can be applied to a distributed positioning system, to implement indoor positioning.

In one embodiment, the method further includes: receiving the auxiliary data sent by the network device. Because the reference signals sent by the antenna elements can be received and distinguished between each other based on the auxiliary data, indoor positioning can be implemented.

According to a ninth aspect, a reference signal sending method is provided, where the method includes:

generating a specified quantity of reference signals, where each reference signal has different attribute information; and respectively converting carrier frequencies of the generated specified quantity of reference signals to different carrier frequencies based on different local frequencies; and sending the specified quantity of reference signals to a specified quantity of antenna elements. A network device uses a frequency domain separation approach to allocate reference signals having different attribute information to different antenna elements, so that a terminal device can identify which antenna element a received reference signal comes from. Therefore, an improved distributed antenna system can implement terminal device positioning, and improve indoor positioning accuracy.

In one embodiment, frequency spectra of the different carrier frequencies do not interfere with each other, so that the reference signals carried on the different carrier frequencies are separated from each other and do not interfere with each other.

According to a tenth aspect, a reference signal sending method is provided, where the method includes:

performing, after receiving a plurality of reference signals sent by a network device, frequency mixing processing on a reference signal carried on a corresponding carrier frequency, to obtain a specified reference signal; and sending the specified reference signal to a terminal device. An antenna element can obtain a reference signal on a carrier frequency corresponding to the antenna element, so that the terminal device can identify which antenna element a received reference signal comes from. Therefore, an improved distributed antenna system can implement terminal device positioning, and improve indoor positioning accuracy.

In one embodiment, after the specified reference signal is obtained, the method further includes:

performing polarization processing on the specified reference signal using a specified polarization type; and sending the polarized specified reference signal to the terminal device. Different antenna elements may polarize reference signals using different polarization types. Therefore, the terminal device can recognize, based on a polarization type of a reference signal, an antenna element that sends the reference signal. In this way, positioning accuracy is improved.

According to an eleventh aspect, a reference signal sending method is provided, where the method includes:

obtaining a specified quantity of scrambling codes, and generating a plurality of reference signals, where each reference signal is scrambled by a different scrambling code, and each reference signal has different attribute information; and sending the plurality of reference signals to a plurality of antenna elements, where each of the specified quantity of antenna elements obtains a reference signal carried on a carrier frequency corresponding to the antenna element. A network device uses a code domain separation approach to allocate reference signals having different attribute information to different antenna elements, so that a terminal device can identify which antenna element a received reference signal comes from. Therefore, an improved distributed antenna system can implement terminal device positioning, and improve indoor positioning accuracy.

In one embodiment, the different scrambling codes are orthogonal to each other, so that reference signals scrambled by different scrambling codes do not interfere with each other.

According to a twelfth aspect, a reference signal sending method is provided, where the method includes:

performing, after receiving a plurality of reference signals, descrambling processing on a reference signal corresponding to a scrambling code, to obtain a specified reference signal, and sending the specified reference signal to a terminal device. Reference signals obtained by different antenna elements are different, so that the terminal device can identify which antenna element a received positioning signal comes from. Therefore, an improved distributed antenna system can implement terminal device positioning, and improve indoor positioning accuracy.

In one embodiment, after the specified reference signal is obtained, the method further includes:

performing polarization processing on the specified reference signal using a specified polarization type; and sending the polarized specified reference signal to the terminal device. Different antenna elements may polarize reference signals using different polarization types. Therefore, the terminal device can recognize, based on a polarization type of a reference signal, an antenna element that sends the reference signal. In this way, positioning accuracy is improved.

According to a thirteenth aspect, a positioning information sending method is provided, where the method includes:

obtaining, based on auxiliary data configured by a network device, identifiers of at least two antenna elements and a polarization type of a reference signal corresponding to each of the at least two antenna elements; receiving at least two reference signals based on the polarization types, where the at least two reference signals are sent by corresponding antenna elements of the at least two antenna elements, respectively; obtaining positioning information by measuring the at least two reference signals; and sending, to the network device, the positioning information and identification information of antenna elements corresponding to the positioning information. A terminal device can identify which antenna element a received reference signal comes from. Therefore, an improved distributed antenna system can implement terminal device positioning, and improve indoor positioning accuracy.

According to a fourteenth aspect, a reference signal sending method is provided, where the method includes:

performing, after receiving a reference signal, polarization processing on a reference signal using a specified polarization type, and sending the polarized reference signal to a terminal device. Different antenna elements may polarize reference signals using different polarization types. Therefore, the terminal device can recognize, based on a polarization type of a reference signal, an antenna element that sends the reference signal. In this way, positioning accuracy is improved.

According to a fifteenth aspect, an antenna element is provided, where the antenna element includes a divider, a frequency mixing module, and an antenna; and the frequency mixing module is configured to: generate a specified local frequency; and perform, based on the specified local frequency after receiving a specified quantity of reference signals using the divider, frequency mixing processing on a reference signal carried on a carrier frequency corresponding to the antenna element, to obtain a specified reference signal, where the specified reference signal is sent by the antenna to a terminal device. An antenna element can obtain a reference signal on a carrier frequency corresponding to the antenna element, so that the terminal device can identify which antenna element a received reference signal comes from. Therefore, an improved distributed antenna system can implement terminal device positioning, and improve indoor positioning accuracy.

According to a sixteenth aspect, an antenna element is provided, where the antenna element includes a divider, a descrambling module, and an antenna; and the descrambling module is configured to: generate a specified scrambling code, and perform, based on the specified scrambling code after receiving a specified quantity of reference signals transmitted by the divider, descrambling processing on a reference signal corresponding to a scrambling code of the antenna element, to obtain a specified reference signal, where the specified reference signal is sent by the antenna to a terminal device. Reference signals obtained by different antenna elements are different, so that the terminal device can identify which antenna element a received reference signal comes from. Therefore, an improved distributed antenna system can implement terminal device positioning, and improve indoor positioning accuracy.

According to a seventeenth aspect, an antenna element is provided, where the antenna element includes a polarization module and an antenna; and the polarization module is configured to perform, after receiving a reference signal, polarization processing on the reference signal using a specified polarization type, to obtain a specified reference signal, where the specified reference signal is sent by the antenna to a terminal device. Different antenna elements may use different polarization types to polarize the reference signal, so that the terminal device can tell, based on a polarization type, which antenna element a received reference signal comes from. Therefore, an improved distributed antenna system can implement terminal device positioning, and improve indoor positioning accuracy.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
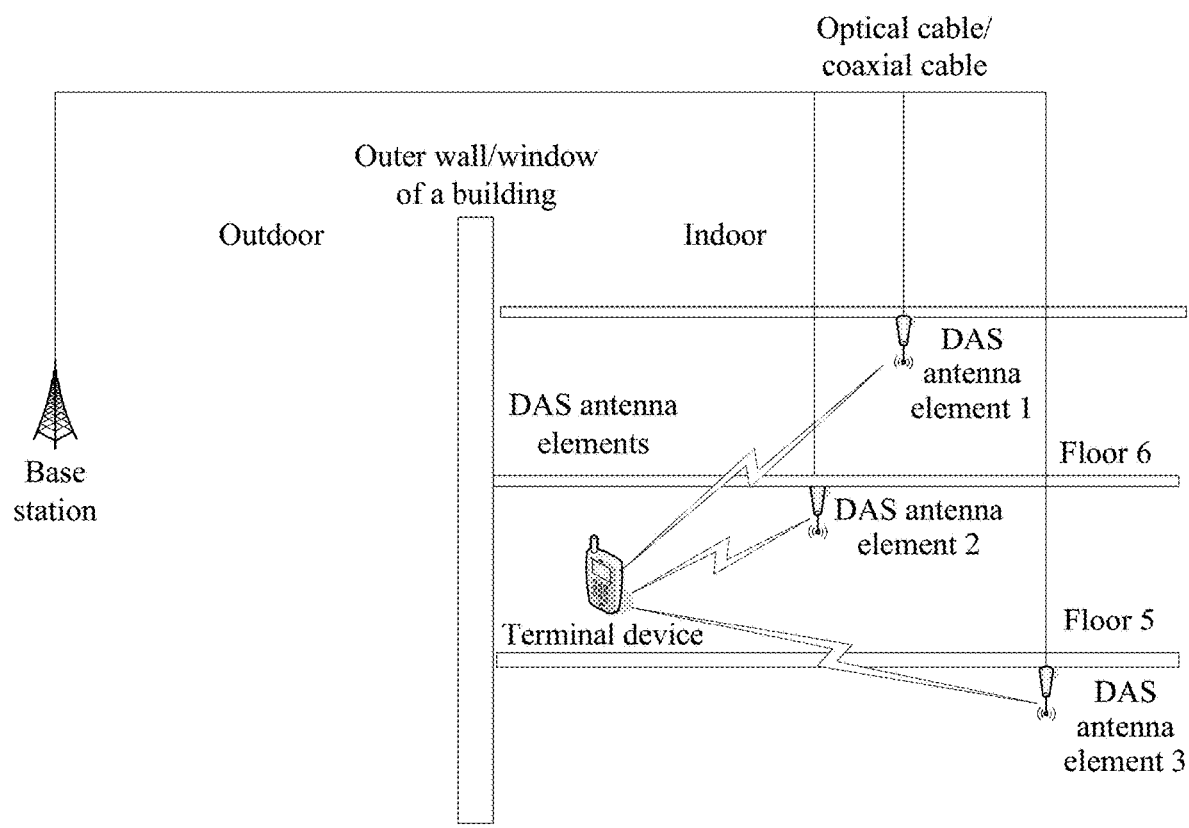
FIG. 1 is a structural diagram of a distributed antenna system.

To better describe the embodiments provided for the present invention, an application scenario of the embodiments of the present invention is first described. An existing distributed antenna system can improve indoor communication quality. Referring to FIG. 1, FIG. 1 is a structural diagram of a distributed antenna system, including a network device and a plurality of antenna elements. The plurality of antenna elements are located indoors and are connected to the network device. The network device (for example, a base station in FIG. 1) in the existing distributed antenna system can send only a same reference signal to all antenna elements connected to the network device. Each antenna element sends a received reference signal to a terminal device. Because all the reference signals are the same, after receiving the reference signals indoors, the terminal device cannot distinguish between the antenna elements that send the reference signals. Therefore, the existing distributed antenna system cannot be used to implement indoor positioning. According to the embodiments of the present invention, the existing distributed antenna system is improved, so that an improved distributed antenna system can implement indoor positioning, and improve indoor positioning accuracy of a mobile network. For details about a specific improvement manner and a specific positioning process, refer to the following embodiments.

Figure 2:
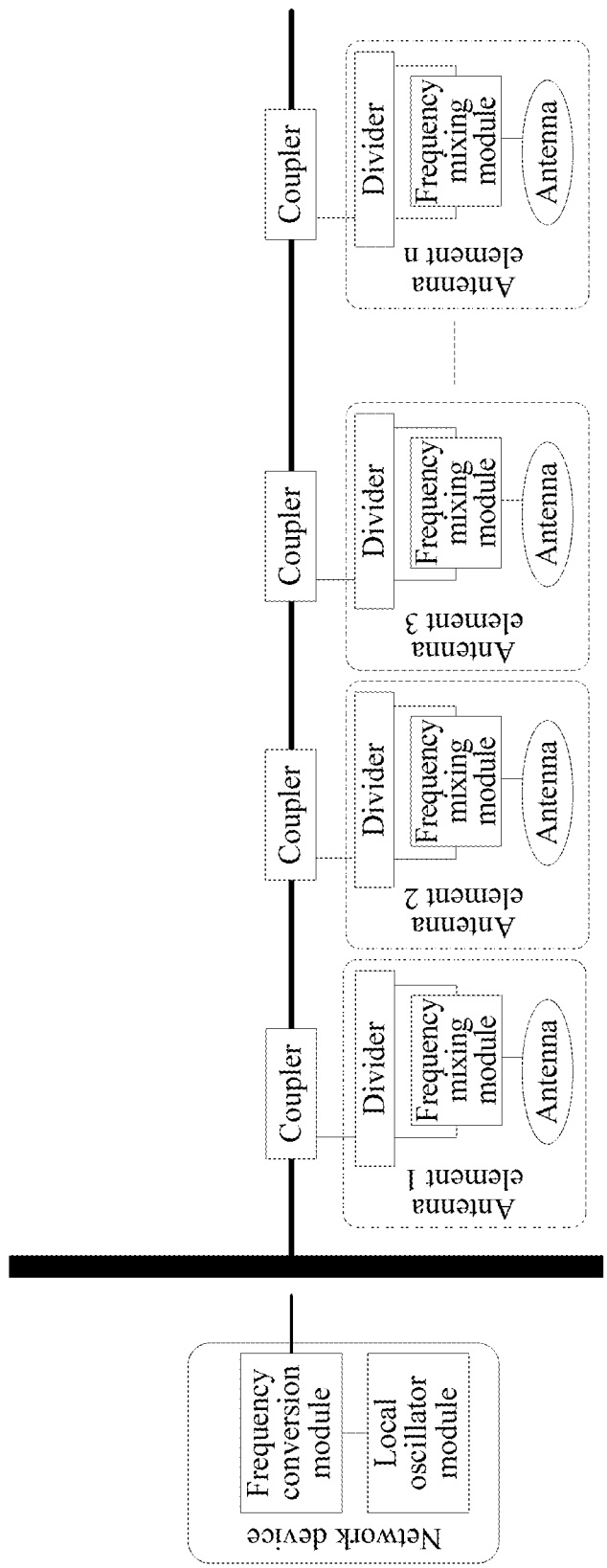
FIG. 2 is a structural diagram of a positioning system according to an embodiment of the present invention.

FIG. 2 is a structural diagram of a positioning system according to an embodiment of the present invention. The positioning system is a distributed antenna system. To ensure that a terminal device can recognize reference signals sent by different antenna elements in the distributed antenna system, and considering that, in a mobile communications system, different signals may be separated and transmitted in different frequency domains, so that a receive side can distinguish between received signals based on the different frequency domains, in one embodiment of the present invention, a frequency domain separation method is used to improve an existing distributed antenna system. Referring to FIG. 2, the distributed antenna system includes a network device and a specified quantity of antenna elements. A frequency conversion module and a local oscillator module are added at a port at which the network device sends signals to the antenna elements. The local oscillator module is configured to generate different local frequencies. The network device is configured to: generate a specified quantity of reference signals having different attribute information, and respectively convert carrier frequencies of the specified quantity of reference signals to different carrier frequencies based on different local frequencies, which means separating different reference signals in frequency domain; and then send the specified quantity of reference signals in different frequency domains to the specified quantity of antenna elements. Each antenna element includes a divider, a frequency mixing module, an antenna, and the like, or includes parts having same functions. The frequency mixing module may generate a specified local frequency, and is configured to: perform frequency mixing processing on a reference signal on a carrier frequency corresponding to the antenna element, and send an obtained specified reference signal to a terminal device. Finally, different antenna elements send different reference signals to the terminal device. In addition, a correspondence between an identifier of each antenna element and attribute information of each reference signal is stored in the network device.

It should be noted that connections between the network device and the specified quantity of antenna elements may be physical connections, for example, coaxial cable or optical cable connections, or may be wireless connections. This is not specifically limited in this embodiment of the present invention. The distributed antenna system shown in FIG. 2 further includes couplers. The couplers and the dividers of the antenna elements are configured to make a signal transmit power allocated to all antenna elements as uniformly as possible, so that transmit powers of all the antenna elements are essentially the same.

Figure 3:
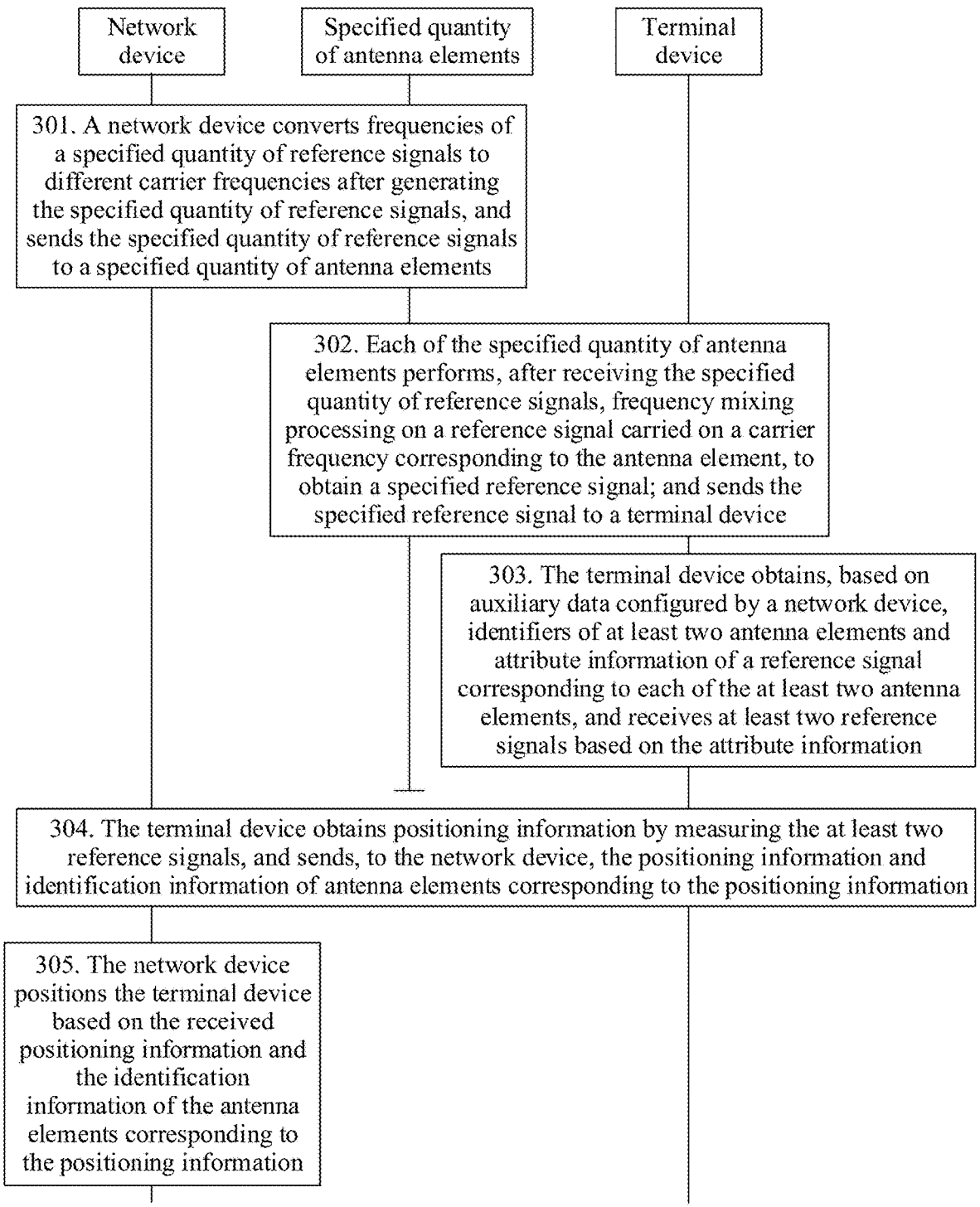
FIG. 3 is a flowchart of a positioning method according to an embodiment of the present invention.

FIG. 3 is a flowchart of a positioning method provided with reference to the positioning system in FIG. 2 according to an embodiment of the present invention. Included interacting entities are a network device, a specified quantity of antenna elements, and a terminal device. Referring to FIG. 3, a process of the method provided in this embodiment of the present invention includes the following operations.

Operation 301. The network device respectively converts carrier frequencies of a specified quantity of reference signals to different carrier frequencies after generating the specified quantity of reference signals, and sends the specified quantity of reference signals to the specified quantity of antenna elements.

In one embodiment of the present invention, the network device is connected to the specified quantity of antenna elements to form a distributed antenna system. The network device is a physical or logical entity in the distributed antenna system that is configured to generate a reference signal and process the reference signal and that has a function of positioning a terminal device. A specific form of the network device is not limited in this embodiment of the present invention. The network device generates the specified quantity of reference signals. Each reference signal has different attribute information. The attribute information includes a pseudorandom sequence, a resource mapping manner, or the like for generating the reference signal, so that the terminal device can restore the corresponding reference signal based on the attribute information. Then, the frequencies of the specified quantity of reference signals are converted to the different carrier frequencies, and the specified quantity of reference signals are sent to the specified quantity of antenna elements. An example embodiment is as follows:

In one embodiment, the network device first generates the specified quantity of reference signals. All the reference signals have a same fixed initial carrier frequency. After the specified quantity of reference signals having the same fixed carrier frequency are transferred to a frequency conversion module, the frequency conversion module converts, based on different local frequencies generated by a local oscillator module, frequencies of the generated specified quantity of reference signals to the different carrier frequencies to obtain the specified quantity of reference signals carried on the different carrier frequencies, and the specified quantity of reference signals carried on the different carrier frequencies are sent to the specified quantity of antenna elements.

For example, the network device first generates three reference signals S1, S2, and S3. S1, S2, and S3 have different identification information and a same fixed initial carrier frequency F1. The local oscillator module generates two local frequencies F4 and F5. The frequency conversion module may be used to respectively convert carrier frequencies of the different reference signals to different carrier frequencies. For example, the frequency conversion module mixes the initial carrier frequency F1 of S2 and the local frequency F4, so that a frequency of the reference signal S2 is converted to the carrier frequency F2. The frequency conversion module mixes the initial carrier frequency F1 of S3 and the local frequency F5, so that a frequency of the reference signal S3 is converted to the carrier frequency F3. Now, a carrier frequency of the reference signal S1 is F1, a carrier frequency of the reference signal S2 is F2, and a carrier frequency of the reference signal S3 is F3. In this way, frequencies of different reference signals are converted to different carrier frequencies.

Frequency spectra of the different carrier frequencies do not interfere with each other.

It should be noted that the foregoing network device generates only three reference signals as an example for the purpose of illustration. A quantity of the reference signals generated by the network device is not specifically limited in embodiments of the present invention. A quantity of the local frequencies generated by the local oscillator module may be the same as the specified quantity of the reference signals generated by the network device, or may be the specified quantity minus 1. This is not specifically limited in embodiments of the present invention. When the quantity of the local frequencies is the specified quantity minus 1, no frequency conversion processing is performed on a carrier frequency of one of the specified quantity of reference signals. The carrier frequency is always a fixed carrier frequency. When the quantity of the local frequencies is the specified quantity, frequency conversion processing is performed on a carrier frequency of each of the specified quantity of reference signals.

Operation 302. Each of the specified quantity of antenna elements performs, after receiving the specified quantity of reference signals, frequency mixing processing on a reference signal carried on a carrier frequency corresponding to the antenna element, to obtain a specified reference signal; and sends the specified reference signal to the terminal device.

In an Long Term Evolution (LTE) system, all signals sent by a network device are at a same frequency. Therefore, in this embodiment of the present invention, the frequency mixing module is further configured to restore a carrier frequency of a reference signal to a fixed carrier frequency. Each of the specified quantity of antenna elements performs, after receiving the specified quantity of reference signals, frequency mixing processing on a reference signal carried on a carrier frequency corresponding to the antenna element, to obtain the specified reference signal. A detailed process is as follows:

After receiving the specified quantity of reference signals using a divider, a frequency mixing module in each antenna element performs, based on a specified local frequency, frequency mixing processing on a reference signal carried on a carrier frequency corresponding to the antenna element, to obtain the specified reference signal. The carrier frequency corresponding to the antenna element is a carrier frequency that can be mixed with the local frequency to obtain the fixed carrier frequency.

For example, the system includes three antenna elements A1, A2, and A3. A frequency mixing module in the antenna element A2 generates a local frequency F4, and a frequency mixing module in the antenna element A3 generates a local frequency F5. With reference to the example in operation 301, after receiving the reference signal S2 whose carrier frequency is F2, the antenna element A2 mixes the carrier frequency F2 and the local frequency F4, to obtain the reference signal S2 whose carrier frequency is the fixed carrier frequency F1; after receiving the reference signal S3 whose carrier frequency is F3, the antenna element A3 performs mixes the carrier frequency F3 and the local frequency F5, to obtain the reference signal S3 whose carrier frequency is the fixed carrier frequency F1; and after the antenna element A1 receives the specified quantity of reference signals, a frequency mixing module in the antenna element A1 directly obtains, through filtering, the reference signal S1 whose carrier frequency is the fixed carrier frequency F1. Finally, each antenna element obtains a specified reference signal having different identification information, and sends the specified reference signal to the terminal device. To be specific, the antenna element A1 sends the reference signal S1 to the terminal device, the antenna element A2 sends the reference signal S2 to the terminal device, and the antenna element A3 sends the reference signal S3 to the terminal device.

It should be noted that local frequencies generated by frequency mixing modules in all the antenna elements should be equal to local frequencies for performing frequency conversion processing on all reference signals by the network device correspondingly in a one-to-one manner. Each antenna element can obtain a different specified reference signal only in this way.

In another embodiment, each antenna element may further include a polarization module. The polarization module is configured to perform polarization processing on the specified reference signal, and send the polarized specified reference signal to the terminal device. Polarization types indicated by polarization modules in different antenna elements are different. The polarization types may be horizontal polarization, perpendicular polarization, circular polarization, elliptical polarization, polarization with a specified angle, and the like. This is not limited in this embodiment of the present invention.

Operation 303. The terminal device obtains, based on auxiliary data configured by the network device, identifiers of at least two antenna elements and attribute information of a reference signal corresponding to each of the at least two antenna elements, and receives at least two reference signals based on the attribute information.

In one embodiment of the present invention, a terminal device positioning process may be initiated by a terminal device side, or may be initiated by a network device side. This is not limited in embodiments of the present invention. The following explanations use an example in which positioning is initiated by the terminal device side. After receiving a positioning request sent by the terminal device, the network device sends positioning capability request signaling to the terminal device. After receiving the signaling, the terminal device replies with corresponding positioning capability information including an available hardware resource, a positioning computation capability, signal quality, or the like. Then, the terminal device sends an auxiliary data request to the network device. The network device returns configured auxiliary data after receiving the auxiliary data request. The auxiliary data includes the identifiers of the at least two antenna elements and the attribute information of the reference signal corresponding to each of the at least two antenna elements. In addition, in an embodiment in which antenna elements are distinguished using polarization types of polarization modules, the auxiliary data may further include a polarization type of the reference signal corresponding to each of the at least two antenna elements. After receiving the auxiliary data, the terminal device obtains, based on the auxiliary data configured by the network device, the identifiers of the at least two antenna elements and the attribute information of the reference signal corresponding to each of the at least two antenna elements, and receives the at least two reference signals based on the attribute information. The at least two reference signals are sent by corresponding antenna elements of the at least two antenna elements, respectively. A process in which the terminal device receives the at least two reference signals based on the attribute information is as follows:

The terminal device restores the at least two reference signals based on the attribute information of each reference signal. Then, the terminal device receives, from the plurality of reference signals sent by the plurality of antenna elements, a reference signal that is the same as each restored reference signal, and obtains identification information of the corresponding antenna element. The identification information of the antenna element may be a name, a device number, an identifier (ID) number, a physical address, an internet protocol (IP) address, or the like of the antenna element. This is not limited in embodiments of the present invention.

It should be noted that, among the identifiers of the at least two antenna elements obtained by the terminal device based on the auxiliary data configured by the network device, an antenna element identifier is any piece of the foregoing antenna element identification information. Distinguishing between an antenna element identifier and antenna element identification information is intended to describe that one antenna element may have different unique identifiers. In a process in which the terminal device communicates with the network device, different identifiers of one antenna element may be used for communication.

It should be noted that the auxiliary data sent by the network device to the terminal device may further include a reference signal receiving time window, so that after receiving the reference signal receiving time window, the terminal device receives, based on the attribute information, only a reference signal within the reference signal receiving time window. In this way, electricity consumption of the terminal device can be reduced.

In another embodiment, the auxiliary data may further include the identifiers of the at least two antenna elements and a polarization type of the reference signal corresponding to each of the at least two antenna elements. The terminal device receives the at least two reference signals based on the polarization types.

Operation 304. The terminal device obtains positioning information by measuring the at least two reference signals, and sends, to the network device, the positioning information and identification information of antenna elements corresponding to the positioning information.

In one embodiment of the present invention, the auxiliary data sent by the network device may further include information for a positioning method to be used. The positioning method may be a time difference of arrival measurement positioning method, an angle detection positioning method, or a field strength detection positioning method. This is not limited in embodiments of the present invention.

The following uses the time difference of arrival measurement positioning method as an example to describe a process in which the terminal device obtains positioning information by measuring the at least two reference signals. The terminal device obtains, after obtaining the at least two reference signals and the identification information of the antenna element corresponding to each of the reference signals, a time difference of arrival between reference signals sent by each two antenna elements, of the at least two reference signals, records identification information of the two antenna elements corresponding to the time difference of arrival, and generates the positioning information. The positioning information includes the time difference of arrival. Then, the positioning information and the identification information of the antenna elements corresponding to the positioning information are sent to the network device. The identification information of the antenna elements corresponding to the positioning information is identification information of two antenna elements corresponding to each time difference of arrival.

It should be noted that the auxiliary data sent by the network device to the terminal device may further include a comparison reference signal. The terminal device records a first time of arrival at which a reference signal having same identification information as the comparison reference signal is received, and after receiving any reference signal based on the attribute information, calculates a second time of arrival of the any reference signal, and determines a time difference between the first time of arrival and the second time of arrival as a time difference of arrival of the any reference signal.

Operation 305. The network device positions the terminal device based on the received positioning information and the identification information of the antenna elements corresponding to the positioning information.

In one embodiment of the present invention, the network device is capable of positioning the terminal device based on the received positioning information and the identification information of the antenna elements corresponding to the positioning information. The time difference of arrival measurement positioning method is used as an example. The network device stores a correspondence between the identification information of each antenna element connected to the network device and a physical location of the antenna element. After receiving the positioning information and the identification information of the antenna elements corresponding to the positioning information that are sent by the terminal device, the network device obtains, based on the identification information of the antenna elements, physical locations of the antenna elements corresponding to the identification information of the antenna elements. Then, the location of the terminal device is obtained based on each time difference of arrival and physical locations of corresponding antenna elements.

It should be noted that, when the terminal device is positioned using the time difference of arrival measurement positioning method, the terminal device sends, to the network device, at least two time differences of arrival and identification information of antenna elements corresponding to each time difference of arrival, so that the network device may obtain at least two hyperbolic positioning areas based on each time difference of arrival and physical locations of antenna elements corresponding to the time difference of arrival, and calculate an intersection location of the at least two hyperbolic positioning areas to determine the location of the terminal device. Then, positioning of the terminal device is completed.

According to another embodiment, the network device converts the frequencies of the specified quantity of reference signals to the different carrier frequencies after generating the specified quantity of reference signals, and sends the specified quantity of reference signals to the specified quantity of antenna elements; each of the specified quantity of antenna elements performs, after receiving the specified quantity of reference signals, frequency mixing processing on the reference signal carried on the carrier frequency corresponding to the antenna element, to obtain the specified reference signal; and sends the specified reference signal to the terminal device; and the terminal device obtains, based on the auxiliary data configured by the network device, the identifiers of the at least two antenna elements and the attribute information of the reference signal corresponding to each of the at least two antenna elements, receives the at least two reference signals based on the attribute information, obtains the positioning information by measuring the at least two reference signals, and sends, to the network device, the positioning information and the identification information of the antenna elements corresponding to the positioning information. Reference signals obtained by different antenna elements are different, so that the terminal device can identify which antenna element a received reference signal comes from. Therefore, an improved distributed antenna system can implement terminal device positioning, and improve indoor positioning accuracy.

Figure 4:
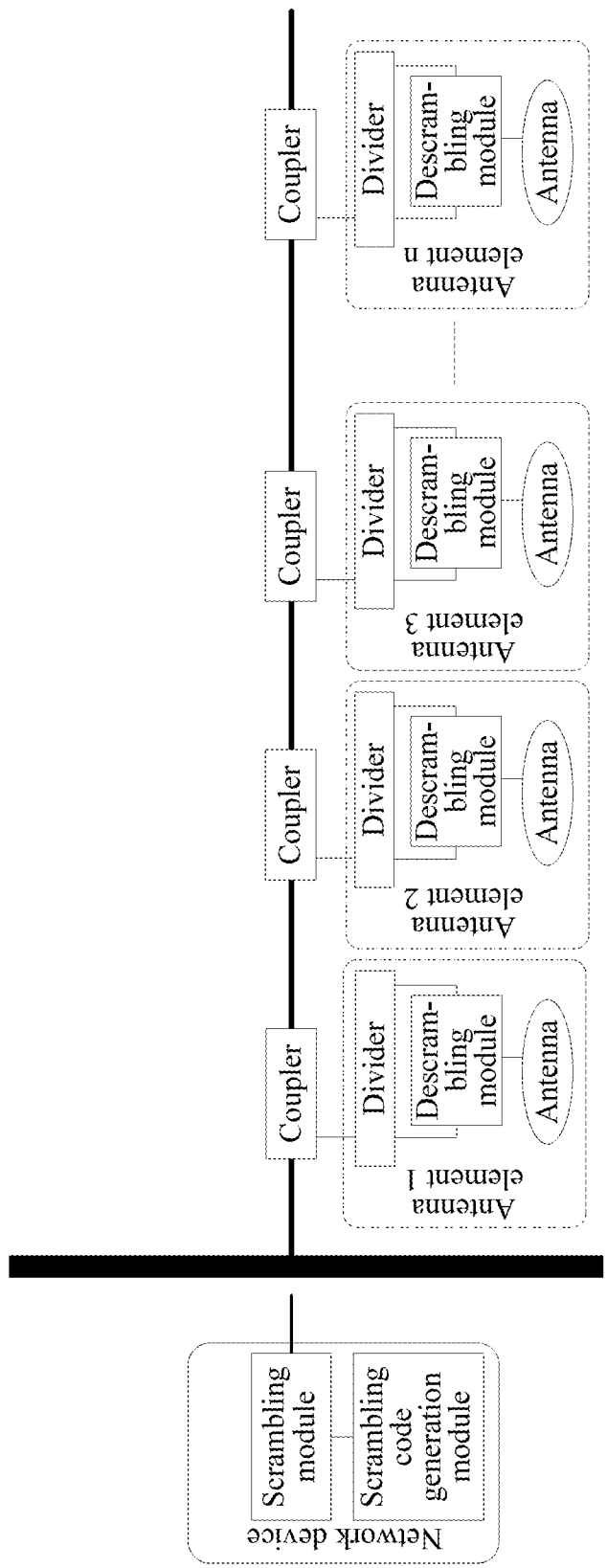
FIG. 4 is a structural diagram of a positioning system according to an embodiment of the present invention.

FIG. 4 is a structural diagram of a positioning system according to an embodiment of the present invention. The positioning system is a distributed antenna system. To ensure that a terminal device can recognize reference signals sent by different antenna elements in the distributed antenna system, and considering that, in a mobile communications system, different signals may be separated and transmitted in different code domains, so that a receive side can distinguish between received signals based on different codewords, in one embodiment of the present invention, a code domain separation method is used to improve an existing distributed antenna system. Referring to FIG. 4, the distributed antenna system includes a network device and a specified quantity of antenna elements connected to the network device. A scrambling module and a scrambling code generation module are added at a port at which the network device sends signals to the antenna elements. The scrambling code generation module is configured to generate different scrambling codes. The network device is configured to generate a specified quantity of reference signals based on the different scrambling codes. Each reference signal is scrambled by a different scrambling code. For example, different reference signals are separated into different code domains. Then the specified quantity of reference signals in different code domains are sent to the specified quantity of antenna elements. Each antenna element includes a divider, a descrambling module, an antenna, and the like, or includes parts having similar functions. The descrambling module may generate a specified scrambling code, and can be configured to: descramble a scrambling code of a reference signal corresponding to an antenna element, and send the obtained specified reference signal to the terminal device using the antenna. Finally, different antenna elements can send different reference signals to the terminal device. In addition, a correspondence between an identifier of each antenna element and attribute information of each reference signal can be stored in the network device.

It should be noted that connections between the network device and the specified quantity of antenna elements may be physical connections, for example, coaxial cable or optical cable connections, or may be wireless connections. This is not limited in embodiments of the present invention. In one embodiment, the distributed antenna system shown in FIG. 4 further includes couplers. The couplers and the dividers are configured to make a signal transmit power allocated to all antenna elements as uniformly as possible, so that transmit powers of all the antenna elements are essentially the same.

Figure 5:
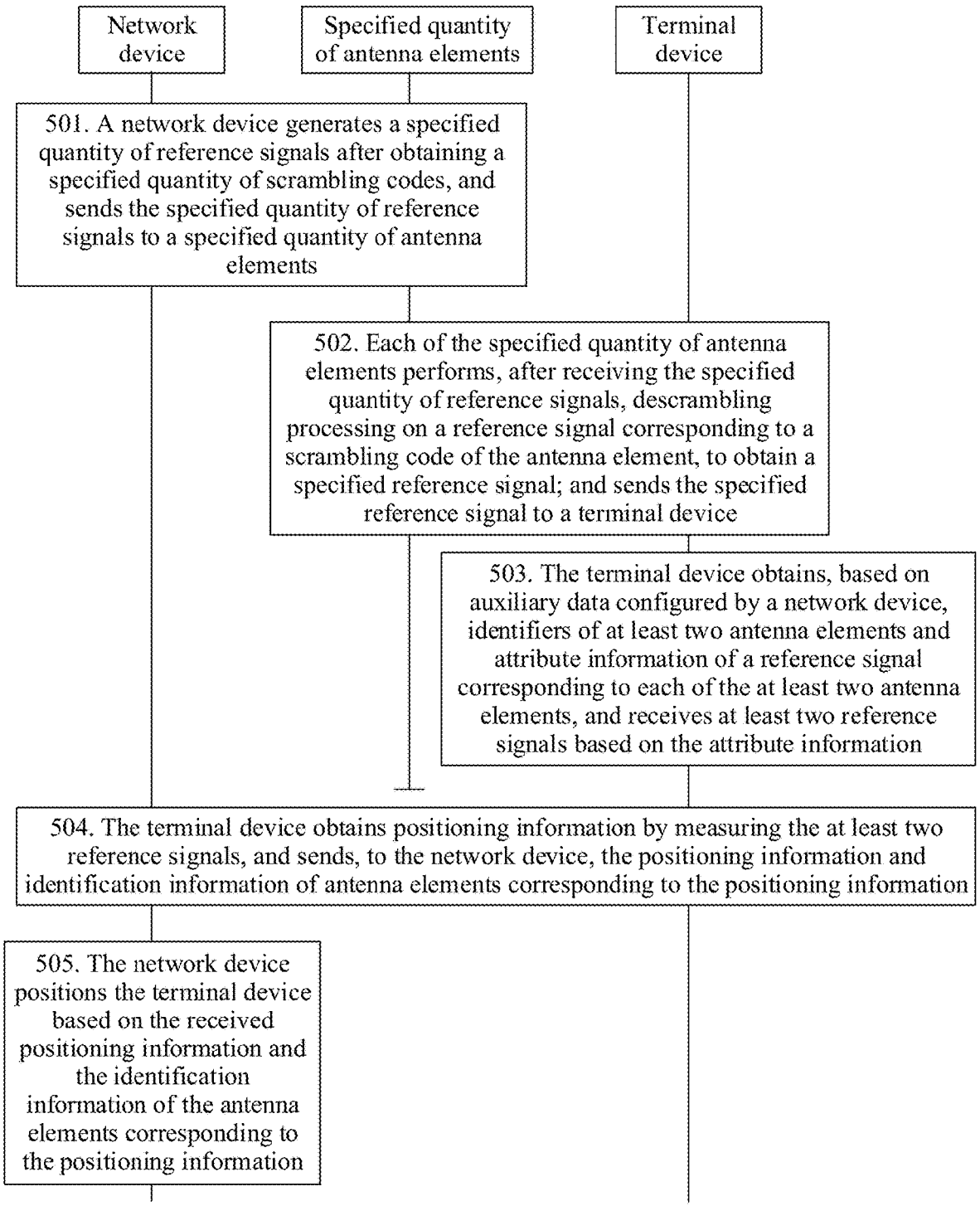
FIG. 5 is a flowchart of a positioning method according to an embodiment of the present invention.

FIG. 5 is a flowchart of a positioning method provided with reference to the positioning system in FIG. 4 according to an embodiment of the present invention. Included interacting entities are a network device, a specified quantity of antenna elements, and a terminal device. Referring to FIG. 5, a process of the method provided in an embodiment of the present invention includes the following operations:

Operation 501. The network device generates a specified quantity of reference signals after obtaining a specified quantity of scrambling codes, and sends the specified quantity of reference signals to the specified quantity of antenna elements.

In one embodiment of the present invention, the network device is connected to the specified quantity of antenna elements to form a distributed antenna system. The network device is a physical or logical entity in the distributed antenna system that is configured to generate a reference signal and process the reference signal and that has a function of positioning a terminal device. A specific form of the network device is not limited in this embodiment of the present invention. After obtaining the specified quantity of scrambling codes, the network device generates the specified quantity of reference signals. Each reference signal is scrambled by a different scrambling code. Each reference signal has different attribute information. The attribute information includes a pseudorandom sequence, a resource mapping manner, or the like for generating the reference signal, so that the terminal device can restore the corresponding reference signal based on the attribute information. The specified quantity of reference signals are sent to the specified quantity of antenna elements. An example process is as follows:

In one embodiment, the network device first generates a specified quantity of initial reference signals having different signal identifiers. The specified quantity of initial reference signals have different identification information. Each initial reference signal is included in a fixed codeword. After the specified quantity of initial reference signals having fixed codewords are transferred to a scrambling module, the scrambling module scrambles, based on different scrambling codes generated by a scrambling code generation module, the specified quantity of initial reference signals into different codewords, to obtain the specified quantity of reference signals, and sends the specified quantity of reference signals to the specified quantity of antenna elements.

For example, the network device first generates three initial reference signals S1, S2, and S3. S1, S2, and S3 have different identification information, and all are included in a fixed codeword C1. The scrambling code generation module generates two scrambling codes C4 and C5. The scrambling module may be used to scramble different initial reference signals into different codewords. For example, the scrambling module scrambles the fixed codeword C1 including S2 using the scrambling code C4 to obtain a codeword C2 including S2, and the scrambling module scrambles the fixed codeword C1 including S3 using the scrambling code C5 to obtain a codeword C3 including S3. Now, a carrier frequency of the reference signal S1 is C1, a carrier frequency of the reference signal S2 is C2, and a carrier frequency of the reference signal S3 is C3. In this way, frequencies of different reference signals are converted to different carrier frequencies.

In one embodiment, different scrambling codes can be orthogonal to each other.

It should be noted that the foregoing network device generates only three reference signals as an example for the purpose of illustration. A quantity of the initial reference signals generated by the network device is not specifically limited in embodiments of the present invention. A quantity of the scrambling codes generated by the scrambling code generation module may be the same as the specified quantity of the initial reference signals generated by the network device, or may be the specified quantity minus 1. This is not limited in embodiments of the present invention. When the quantity of the scrambling codes is the specified quantity minus 1, no scrambling processing is performed by the scrambling code module on one of the specified quantity of initial reference signals. When the quantity of the scrambling codes is the specified quantity, scrambling processing is performed by the scrambling code module on each of the specified quantity of initial reference signals.

In another embodiment, the network device directly obtains a specified quantity of scrambling codes, generates, based on the specified quantity of scrambling codes, a specified quantity of reference signals having different codewords, and then sends the specified quantity of reference signals to the specified quantity of antenna elements.

502. Each of the specified quantity of antenna elements performs, after receiving the specified quantity of reference signals, descrambling processing on a reference signal corresponding to a scrambling code of the antenna element, to obtain a specified reference signal; and sends the specified reference signal to the terminal device.

In an embodiment of the present invention, each of the specified quantity of antenna elements performs, after receiving the specified quantity of reference signals, descrambling processing on a reference signal corresponding to a scrambling code of the antenna element, to obtain the specified reference signal. A detailed process is as follows:

A descrambling module in each antenna element performs, based on the specified scrambling code after receiving the specified quantity of reference signals using the divider, descrambling processing on the reference signal corresponding to the scrambling code of the antenna element, to obtain the specified reference signal whose codeword is a fixed codeword. The reference signal corresponding to the scrambling code of the antenna element is a reference signal obtained after the network device scrambles any initial reference signal using a scrambling code that is the same as the specified scrambling code.

For example, there are three antenna elements A1, A2, and A3. A descrambling module in the antenna element A2 generates a scrambling code C4, and a descrambling module in the antenna element A3 generates a scrambling code C5. With reference to the example in operation 501, after receiving the reference signal S2 whose codeword is C2, the antenna element A2 descrambles the codeword C2 using the scrambling code C4, to obtain the reference signal S2 whose codeword is a fixed codeword C1; after receiving the reference signal S3 whose codeword is C3, the antenna element A3 descrambles the codeword C3 using the scrambling code C5, to obtain the reference signal S3 whose codeword is the fixed codeword C1; and after the antenna element A1 receives the specified quantity of reference signals, a descrambling module included in the antenna element A1 directly obtains the reference signal S1 whose codeword is the fixed codeword C1. Finally, each antenna element obtains a specified reference signal having different identification information, and sends the specified reference signal to the terminal device. To be specific, the antenna element A1 sends the reference signal S1 to the terminal device, the antenna element A2 sends the reference signal S2 to the terminal device, and the antenna element A3 sends the reference signal S3 to the terminal device.

It should be noted that the scrambling codes generated by descrambling modules in all the antenna elements should be equal to scrambling codes for performing scrambling processing on all reference signals by the network device correspondingly in a one-to-one manner. Each antenna element can obtain a different specified reference signal only in this way.

In another embodiment, each antenna element may further include a polarization module. The polarization module is configured to perform polarization processing on the specified reference signal, and send the polarized specified reference signal to the terminal device. Polarization types indicated by polarization modules in different antenna elements are different. The polarization types may be horizontal polarization, perpendicular polarization, circular polarization, elliptical polarization, polarization with a specified angle, and the like. This is not limited in embodiments of the present invention.

Operation 503. The terminal device obtains, based on auxiliary data configured by the network device, identifiers of at least two antenna elements and attribute information of a reference signal corresponding to each of the at least two antenna elements, and receives at least two reference signals based on the attribute information.

In an embodiment of the present invention, this operation is the same as the process in operation 303 in which the terminal device obtains, based on auxiliary data configured by the network device, identifiers of at least two antenna elements and attribute information of a reference signal corresponding to each of the at least two antenna elements, and receives at least two reference signals based on the attribute information. No details are repeated herein.

Operation 504. The terminal device obtains positioning information by measuring the at least two reference signals, and sends, to the network device, the positioning information and identification information of antenna elements corresponding to the positioning information.

In an embodiment of the present invention, this operation is the same as the process in operation 304 in which the terminal device obtains positioning information by measuring the at least two reference signals, and sends, to the network device, the positioning information and identification information of antenna elements corresponding to the positioning information. No details are repeated herein.

Operation 505. The network device positions the terminal device based on the received positioning information and the identification information of the antenna elements corresponding to the positioning information.

In an embodiment of the present invention, this operation is the same as the process in operation 305 in which the network device positions the terminal device based on received positioning data. No details are repeated herein.

According to the method provided in an embodiment of the present invention, the network device generates the specified quantity of reference signals based on the specified quantity of scrambling codes, where each reference signal is scrambled by a different scrambling code; and then sends the specified quantity of reference signals to the specified quantity of antenna elements; each of the specified quantity of antenna elements performs, after receiving the specified quantity of reference signals, descrambling processing on the reference signal corresponding to the scrambling code of the antenna element, to obtain the specified reference signal; and sends the specified reference signal to the terminal device; and the terminal device obtains, based on the auxiliary data configured by the network device, the identifiers of the at least two antenna elements and the attribute information of the reference signal corresponding to each of the at least two antenna elements, receives the at least two reference signals based on the attribute information, obtains the positioning information by measuring the at least two reference signals, and sends, to the network device, the positioning information and the identification information of the antenna elements corresponding to the positioning information. Reference signals obtained by different antenna elements are different, so that the terminal device can identify which antenna element a received reference signal comes from. Therefore, an improved distributed antenna system can implement terminal device positioning, and improve indoor positioning accuracy.

Figure 6:
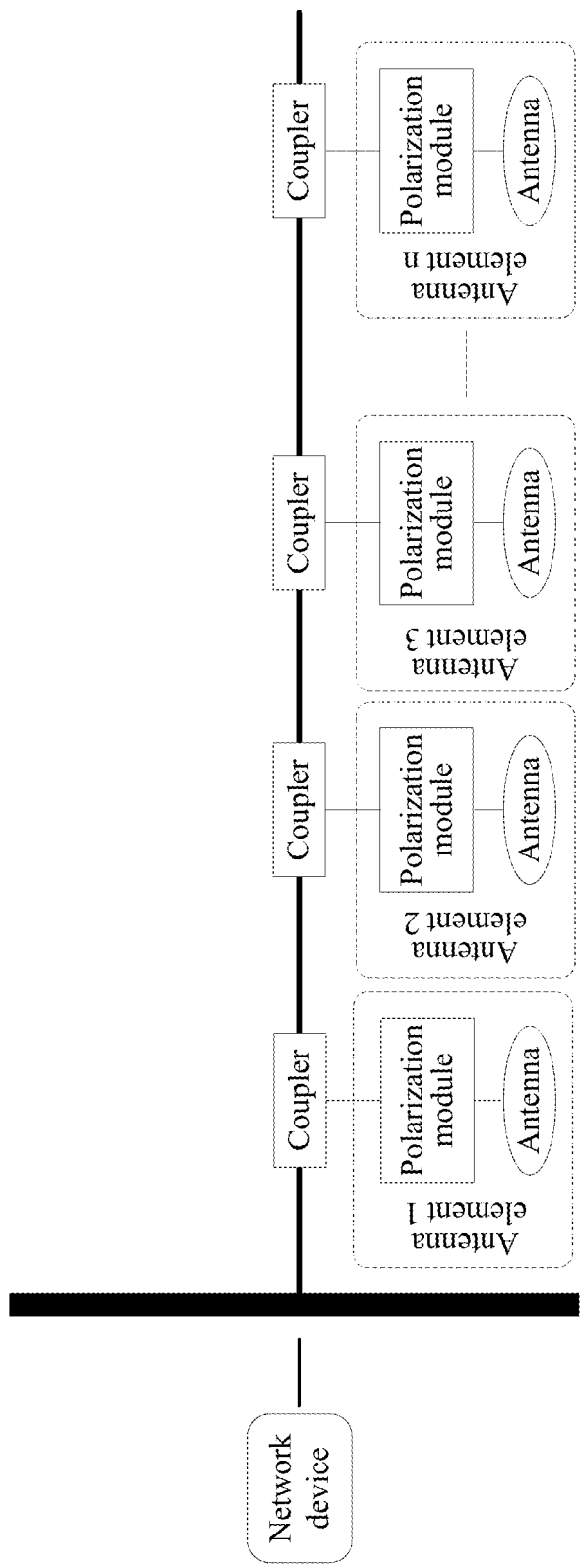
FIG. 6 is a structural diagram of a positioning system according to an embodiment of the present invention.

FIG. 6 is a structural diagram of a positioning system according to an embodiment of the present invention. The positioning system is a distributed antenna system. To ensure that a terminal device can recognize reference signals sent by different antenna elements in the distributed antenna system, and considering that, in a mobile communications system, different signals may be polarized using different polarization types, so that a receive side can distinguish between received signals based on the different frequency domains, in this embodiment of the present invention, a polarization separation method is used to improve an existing distributed antenna system. Referring to FIG. 6, the distributed antenna system includes a network device and a specified quantity of antenna elements. The network device is configured to: generate a reference signal, and send the reference signal to the specified quantity of antenna elements. Each antenna element includes a polarization module, an antenna, and the like, or includes parts having same functions. The polarization module is configured to polarize the reference signal using a specified polarization type, to obtain a specified reference signal. Polarization types indicated by polarization modules in different antenna elements are different. The polarization types may be horizontal polarization, perpendicular polarization, circular polarization, elliptical polarization, polarization with a specified angle, and the like. This is not limited in embodiments of the present invention. Then, the obtained specified reference signal is sent to the terminal device using the antenna. Finally, different antenna elements send reference signals of different polarization types to the terminal device. In addition, a correspondence between an identifier of each antenna element and a polarization type of a reference signal corresponding to the antenna element can be stored in the network device.

It should be noted that connections between the network device and the specified quantity of antenna elements may be physical connections, for example, coaxial cable or optical cable connections, or may be wireless connections. This is not limited in embodiments of the present invention. The distributed antenna system shown in FIG. 6 further includes couplers that are configured to make a signal transmit power allocated to all antenna elements as uniformly as possible, so that transmit powers of all the antenna elements are approximately the same.

Figure 7:
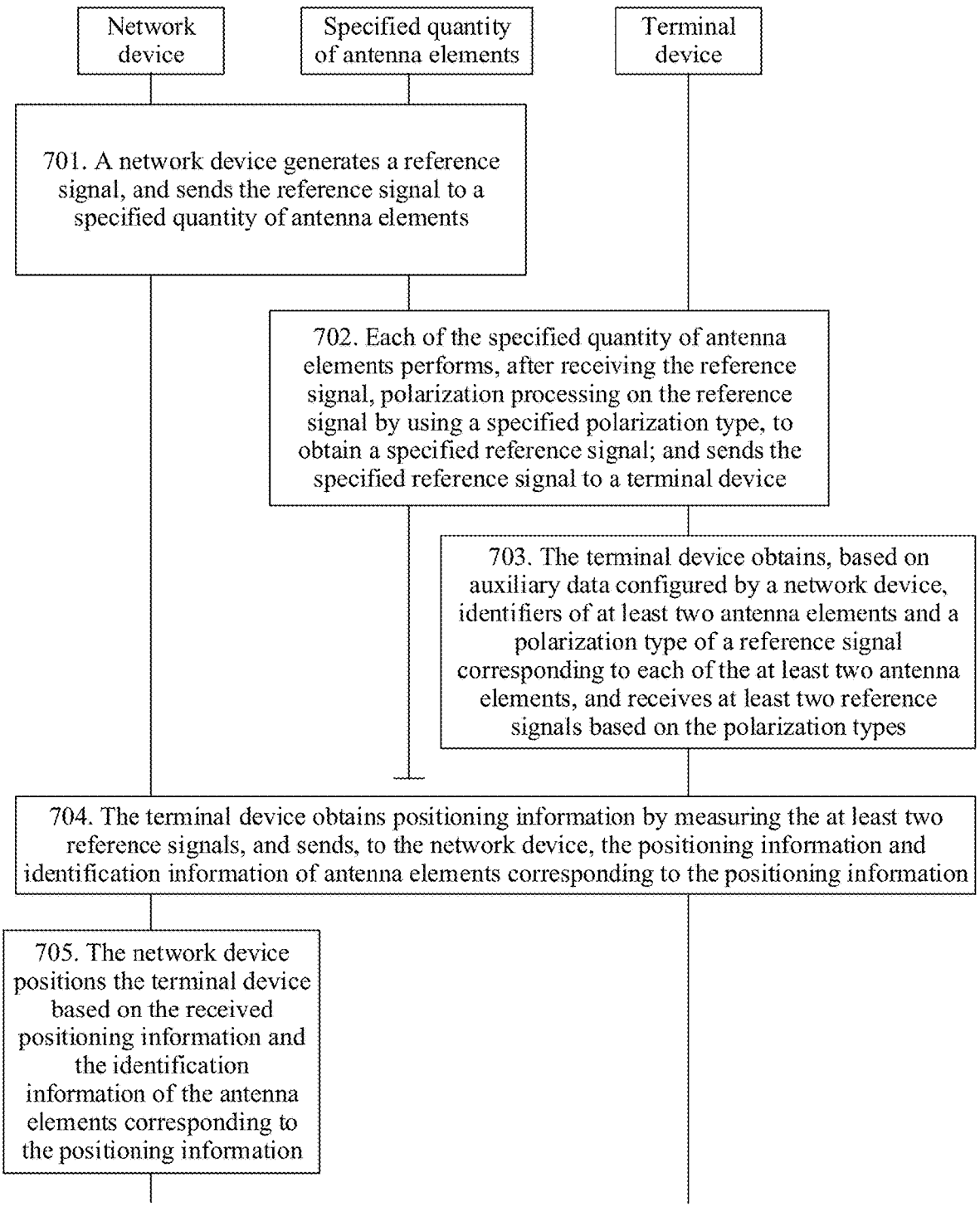
FIG. 7 is a flowchart of a positioning method according to an embodiment of the present invention.

FIG. 7 is a flowchart of a positioning method provided with reference to the positioning system in FIG. 6 according to an embodiment of the present invention. Included interacting entities are a network device, a specified quantity of antenna elements, and a terminal device. Referring to FIG. 7, a process of the method provided in one embodiment of the present invention includes the following operations.

Operation 701. The network device generates a reference signal, and sends the reference signal to the specified quantity of antenna elements.

In one embodiment of the present invention, the network device is connected to the specified quantity of antenna elements to form a distributed antenna system. The network device is a physical or logical entity in the distributed antenna system that is configured to generate a reference signal and process the reference signal and that has a function of positioning a terminal device. A specific form of the network device is not limited in embodiments of the present invention. After generating the reference signal, the network device sends the reference signal to the specified quantity of antenna elements. At this time, the network device does not process the reference signal, and all of the specified quantity of antenna elements receive the same reference signal.

Operation 702. Each of the specified quantity of antenna elements performs, after receiving the reference signal, polarization processing on the reference signal using a specified polarization type, to obtain a specified reference signal; and sends the specified reference signal to the terminal device.

In one embodiment of the present invention, polarization modules in different antenna elements in the system indicate different polarization types. The polarization types may be horizontal polarization, perpendicular polarization, circular polarization, elliptical polarization, polarization with a specified angle, and the like. This is not limited in this embodiment of the present invention. Each antenna element performs, after receiving the reference signal, polarization processing on the specified signal using the polarization module and a specified polarization type, to obtain the specified reference signal; and sends the specified reference signal to the terminal device. After the specified quantity of antenna elements perform polarization processing on the reference signal, specified reference signals of different polarization types are obtained.

For example, the system includes three antenna elements A1, A2, and A3. A polarization type corresponding to a polarization module P1 in the antenna element A1 is horizontal polarization, a polarization type corresponding to a polarization module P2 in the antenna element A2 is circular polarization, and a polarization type corresponding to a polarization module P3 in the antenna element A3 is perpendicular polarization. The antenna element A1 horizontally polarizes, after receiving the reference signal, the reference signal using the polarization module P1, and sends the horizontally polarized reference signal to the terminal device. The antenna element A2 circularly polarizes, after receiving the reference signal, the reference signal using the polarization module P2, and sends the circularly polarized reference signal to the terminal device. The antenna element A3 perpendicularly polarizes, after receiving the reference signal, the reference signal using the polarization module P3, and sends the perpendicularly polarized reference signal to the terminal device. Now, different antenna elements have sent reference signals of different polarization types to the terminal device, so that the terminal device may determine, based on the different polarization types, antenna elements corresponding to the received reference signals. For details about a specific process, refer to operation 703.

It should be noted that three antenna elements are used only as an example for description in embodiments of the present invention. A specific quantity of antenna elements is not limited during actual application.

Operation 703. The terminal device obtains, based on auxiliary data configured by the network device, identifiers of at least two antenna elements and a polarization type of a reference signal corresponding to each of the at least two antenna elements, and receives at least two reference signals based on the polarization types.

In one embodiment of the present invention, a terminal device positioning process may be initiated by a terminal device side, or may be initiated by a network device side. This is not limited in this embodiment of the present invention. The following makes explanations using an example in which positioning is initiated by the terminal device side. After receiving a positioning request sent by the terminal device, the network device sends positioning capability request signaling to the terminal device. After receiving the signaling, the terminal device replies with corresponding positioning capability information including an available hardware resource, a positioning computation capability, signal quality, or the like. Then, the terminal device sends an auxiliary data request to the network device. The network device returns configured auxiliary data after receiving the auxiliary data request. The auxiliary data includes the identifiers of the at least two antenna elements and a polarization type of a reference signal corresponding to each of the at least two antenna elements. The terminal device obtains, based on the auxiliary data configured by the network device, the identifiers of the at least two antenna elements and the polarization type of the reference signal corresponding to each of the at least two antenna elements, and receives at least two reference signals based on the polarization types. With reference to the example in operation 702, for a correspondence in the auxiliary data between an identifier of each antenna element and a polarization type of a reference signal corresponding to the antenna element, refer to Table 1:

TABLE 1

| Antenna element identifier | Reference signal polarization type |
|---|---|
| A1 | P1 |
| A2 | P2 |
| A3 | P3 |

After receiving a reference signal whose polarization type is P1, the terminal device may obtain, based on the correspondence shown in Table 1, the antenna element identifier A1 corresponding to P1. Similarly, the terminal device may obtain the antenna element identifier A2 corresponding to a reference signal whose polarization type is P2, and the antenna element identifier A3 corresponding to a reference signal whose polarization type is P3.

It should be noted that the auxiliary data sent by the network device to the terminal device may further include a reference signal receiving time window, so that after receiving the reference signal receiving time window, the terminal device receives, based on the polarization type, only a reference signal within the reference signal receiving time window. In this way, electricity consumption of the terminal device can be reduced.

Operation 704. The terminal device obtains positioning information by measuring the at least two reference signals, and sends, to the network device, the positioning information and identification information of antenna elements corresponding to the positioning information.

In one embodiment of the present invention, this operation is the same as the process in operation 304 in which the terminal device obtains positioning information by measuring the at least two reference signals, and sends, to the network device, the positioning information and identification information of antenna elements corresponding to the positioning information. No details are repeated herein.

Operation 705. The network device positions the terminal device based on the received positioning information and the identification information of the antenna elements corresponding to the positioning information.

In one embodiment of the present invention, this operation is the same as the process in operation 305 in which the network device positions the terminal device based on received positioning data. No details are repeated herein.

According to another embodiment of the present invention, the network device sends the generated reference signal to the specified quantity of antenna elements; each of the specified quantity of antenna elements performs, after receiving the reference signal, polarization processing on the reference signal using the specified polarization type, to obtain the specified reference signal; and sends the specified reference signal to the terminal device; and the terminal device obtains, based on the auxiliary data configured by the network device, the identifiers of the at least two antenna elements and the a polarization type of the reference signal corresponding to each of the at least two antenna elements, receives the at least two reference signals based on the attribute information, obtains the positioning information by measuring the at least two reference signals, and sends, to the network device, the positioning information and the identification information of the antenna elements corresponding to the positioning information. Different antenna elements may use different polarization types to polarize reference signals, so that the terminal device can tell, based on a polarization type, which antenna element a received reference signal comes from. Therefore, an improved distributed antenna system can implement terminal device positioning, and improve indoor positioning accuracy.

It should be noted that the foregoing embodiments may be implemented separately, or may be implemented in a combined way. This is not limited in embodiments of the present invention.

Figure 8:
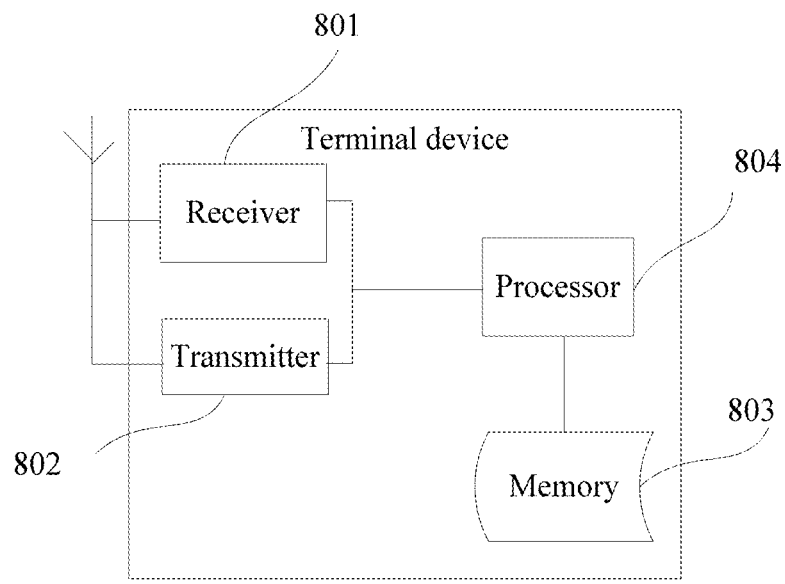
FIG. 8 is a schematic structural diagram of a terminal device according to an embodiment of the present invention.

FIG. 8 is a schematic structural diagram of a terminal device according to an embodiment of the present invention. Referring to FIG. 8, the terminal device includes a receiver 801, a transmitter 802, a processor 803, and a memory 804. The receiver 801, the transmitter 802, and the memory 804 are separately coupled to the processor 803, and the processor 803 is configured to: obtain, based on auxiliary data configured by a network device, identifiers of at least two antenna elements and attribute information of a reference signal corresponding to each of the at least two antenna elements; receive at least two reference signals based on the attribute information, where the at least two reference signals are sent by corresponding antenna elements of the at least two antenna elements, respectively; obtain positioning information by measuring the at least two reference signals; and send, to the network device, the positioning information and identification information of antenna elements corresponding to the positioning information.

In one embodiment, the positioning information includes a time difference of arrival, and the processor 803 is configured to obtain a time difference of arrival between reference signals sent by each two antenna elements, of the at least two reference signals. Because the terminal device can identify an antenna element that sends each reference signal, the observed time difference of arrival positioning method can be applied to a distributed positioning system, to implement indoor positioning.

In one embodiment, the processor 803 is configured to receive the auxiliary data sent by the network device. Because the reference signals sent by the antenna elements can be received and distinguished based on the auxiliary data, indoor positioning can be implemented.

The terminal device provided in an embodiment of the present invention obtains, based on the auxiliary data configured by the network device, the identifiers of the at least two antenna elements and the attribute information of the reference signal corresponding to each of the at least two antenna elements; receives the at least two reference signals based on the attribute information, where the at least two reference signals are sent by corresponding antenna elements of the at least two antenna elements, respectively; obtains the positioning information by measuring the at least two reference signals; and sends, to the network device, the positioning information and the identification information of the antenna elements corresponding to the positioning information. The terminal device can identify which antenna element a received reference signal comes from. Therefore, an improved distributed antenna system can implement terminal device positioning, and improve indoor positioning accuracy.

Figure 9:
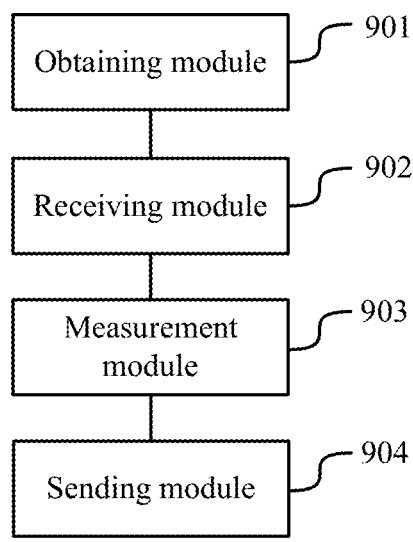
FIG. 9 is a block diagram of a positioning information sending apparatus according to an embodiment of the present invention.

FIG. 9 is a block diagram of a positioning information sending apparatus according to an embodiment of the present invention. Referring to FIG. 9, the apparatus includes an obtaining module 901, a receiving module 902, a measurement module 903, and a sending module 904.

The obtaining module 901 is connected to the receiving module 902, and is configured to obtain, based on auxiliary data configured by a network device, identifiers of at least two antenna elements and attribute information of a reference signal corresponding to each of the at least two antenna elements. The receiving module 902 is connected to the measurement module 903, and is configured to receive at least two reference signals based on the attribute information. The at least two reference signals are sent by corresponding antenna elements of the at least two antenna elements, respectively. The measurement module 903 is connected to the sending module 904, and is configured to obtain positioning information by measuring the at least two reference signals. The sending module 904 is configured to send, to the network device, the positioning information and identification information of antenna elements corresponding to the positioning information.

In one embodiment, the positioning information includes a time difference of arrival. The measurement module 903 is configured to obtain a time difference of arrival between reference signals sent by each two antenna elements, of the at least two reference signals. Because the terminal device can identify an antenna element that sends each reference signal, the observed time difference of arrival positioning method can be applied to a distributed positioning system, to implement indoor positioning.

In one embodiment, the receiving module 902 is further configured to receive the auxiliary data sent by the network device. Because the reference signals sent by the antenna elements can be received and distinguished based on the auxiliary data, indoor positioning can be implemented.

The apparatus provided in one embodiment of the present invention obtains, based on the auxiliary data configured by the network device, the identifiers of the at least two antenna elements and the attribute information of the reference signal corresponding to each of the at least two antenna elements; receives the at least two reference signals based on the attribute information, where the at least two reference signals are sent by corresponding antenna elements of the at least two antenna elements, respectively; obtains the positioning information by measuring the at least two reference signals; and sends, to the network device, the positioning information and the identification information of the antenna elements corresponding to the positioning information. The terminal device can identify which antenna element a received reference signal comes from. Therefore, an improved distributed antenna system can implement terminal device positioning, and improve indoor positioning accuracy.

Figure 10:
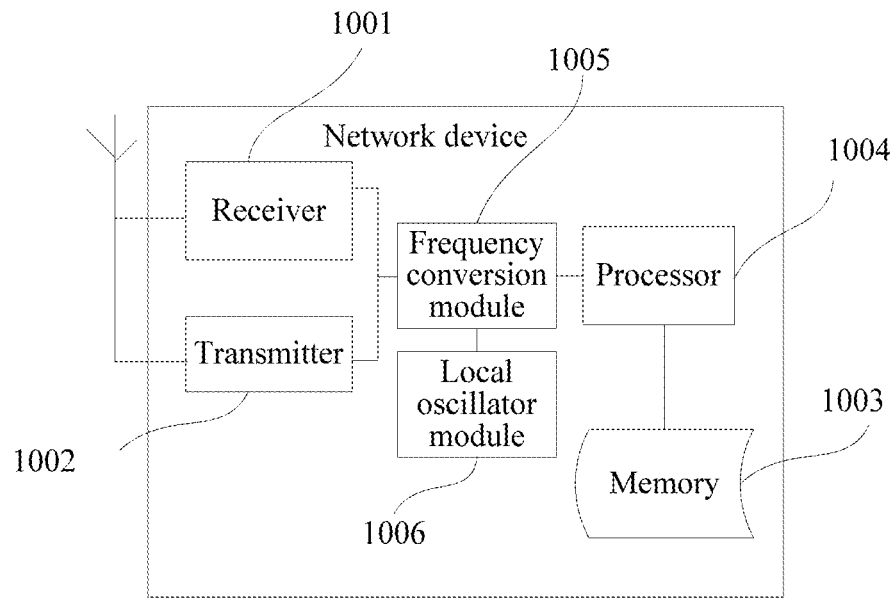
FIG. 10 is a schematic structural diagram of a network device according to an embodiment of the present invention.

FIG. 10 is a schematic structural diagram of a network device according to an embodiment of the present invention. Referring to FIG. 10, the network device includes a receiver 1001, a transmitter 1002, a memory 1003, and a processor 1004. The receiver 1001, the transmitter 1002, and the memory 1003 are separately connected to the processor 1004, and the processor 1004 is configured to generate a specified quantity of reference signals. Each reference signal has different attribute information. The network device further includes a frequency conversion module 1005 and a local oscillator module 1006. The local oscillator module is connected to the frequency conversion module, and the frequency conversion module is connected to the transmitter. The frequency conversion module is configured to respectively convert, based on different local frequencies generated by the local oscillator module, carrier frequencies of the generated specified quantity of reference signals to different carrier frequencies, where the specified quantity of reference signals are sent through the transmitter to a specified quantity of antenna elements.

The network device provided in one embodiment of the present invention generates the specified quantity of reference signals, where each reference signal has different identification information; and converts the frequencies of the specified quantity of reference signals to the different carrier frequencies, and sends the specified quantity of reference signals to the specified quantity of antenna elements. Each of the specified quantity of antenna elements obtains a reference signal carried on a carrier frequency corresponding to the antenna element. The network device uses a frequency domain separation approach to allocate reference signals having different identification information to different antenna elements, so that a terminal device can identify which antenna element a received reference signal comes from. Therefore, an improved distributed antenna system can implement terminal device positioning, and improve indoor positioning accuracy.

Figure 11:
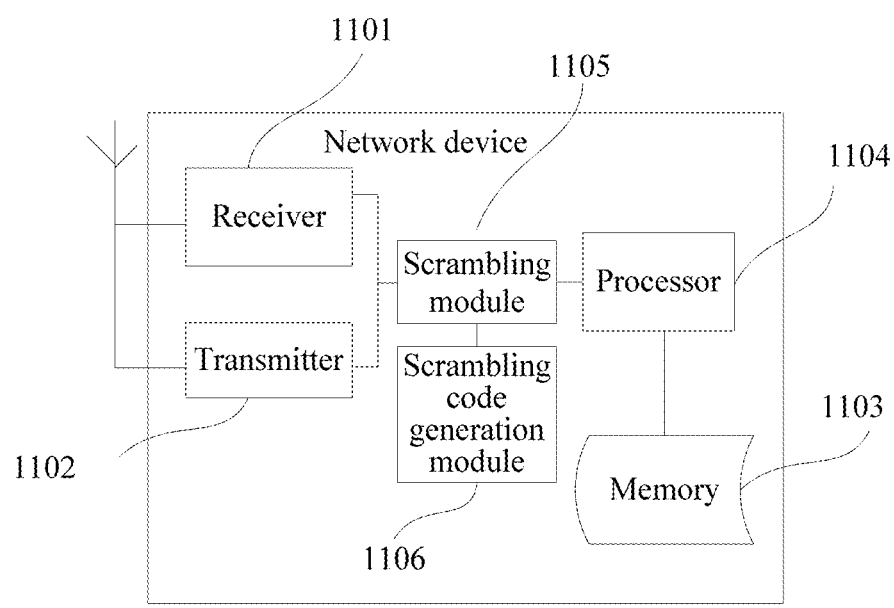
FIG. 11 is a schematic structural diagram of a network device according to an embodiment of the present invention.

FIG. 11 is a schematic structural diagram of a network device according to an embodiment of the present invention. Referring to FIG. 11, the network device includes a receiver 1101, a transmitter 1102, a memory 1103, and a processor 1104. The receiver 1101, the transmitter 1102, and the memory 1103 are separately connected to the processor 1104, and the processor 1104 is configured to: obtain a specified quantity of scrambling codes, and generate a specified quantity of reference signals. Each reference signal is scrambled by a different scrambling code. The network device further includes a scrambling module 1105 and a scrambling code generation module 1106. The scrambling module is connected to the scrambling code generation module, and the scrambling module is connected to the transmitter. The scrambling code generation module is configured to generate a specified quantity of scrambling codes. The scrambling module is configured to generate a specified quantity of reference signals. Each reference signal is scrambled by a different scrambling code. The specified quantity of reference signals are sent through the transmitter to a specified quantity of antenna elements.

The network device provided in one embodiment of the present invention obtains the specified quantity of scrambling codes; generates the specified quantity of reference signals, where all the reference signals are scrambled by the different scrambling codes; and sends the specified quantity of reference signals to the specified quantity of antenna elements. Each of the specified quantity of antenna elements obtains a reference signal corresponding to a scrambling code of the antenna element. The network device uses a code domain separation approach to allocate reference signals having different identification information to different antenna elements, so that a terminal device can identify which antenna element a received reference signal comes from. Therefore, an improved distributed antenna system can implement terminal device positioning, and improve indoor positioning accuracy.

Another embodiment of the present invention further provides a positioning system. The system includes a network device and a plurality of antenna elements. The network device is configured to: generate a plurality of reference signals having different identification information, respectively convert carrier frequencies of the plurality of reference signals to different carrier frequencies, and send the plurality of reference signals to the plurality of antenna elements. The plurality of reference signals are different positioning reference signals. Each of the plurality of antenna elements is configured to: perform, after receiving the plurality of reference signals sent by the network device, frequency mixing processing on a reference signal carried on a carrier frequency corresponding to the antenna element, to obtain a specified reference signal; and send the specified reference signal to a terminal device.

In one embodiment, each antenna element is further configured to: perform, after obtaining the specified reference signal, polarization processing on the specified reference signal using a specified polarization type; and send the polarized specified reference signal to the terminal device. Different antenna elements may polarize reference signals using different polarization types. Therefore, the terminal device can recognize, based on a polarization type of a reference signal, an antenna element that sends the reference signal. In this way, positioning accuracy is improved.

According to the system provided in one embodiment of the present invention, the network device converts the frequencies of the specified quantity of reference signals to the different carrier frequencies after generating the specified quantity of reference signals, and sends the specified quantity of reference signals to the specified quantity of antenna elements. Each of the specified quantity of antenna elements performs, after receiving the specified quantity of reference signals, frequency mixing processing on the reference signal carried on the carrier frequency corresponding to the antenna element, to obtain the specified reference signal; and sends the specified reference signal to the terminal device. Reference signals obtained by different antenna elements are different, so that the terminal device can identify which antenna element a received reference signal comes from. Therefore, an improved distributed antenna system can implement terminal device positioning, and improve indoor positioning accuracy.

Another embodiment of the present invention further provides a positioning system. The system includes a network device and a plurality of antenna elements. The network device is configured to: obtain a specified quantity of scrambling codes, and generate a plurality of reference signals, where each reference signal is scrambled by a different scrambling code; and send the plurality of reference signals to the plurality of antenna elements. Each of the plurality of antenna elements is configured to: perform, after receiving the plurality of reference signals, descrambling processing on a reference signal corresponding to a scrambling code of the antenna element, to obtain a specified reference signal; and send the specified reference signal to a terminal device.

In one embodiment, each antenna element is further configured to: perform, after obtaining the specified reference signal, polarization processing on the specified reference signal using a specified polarization type; and send the polarized specified reference signal to the terminal device. Different antenna elements may polarize reference signals using different polarization types. Therefore, the terminal device can recognize, based on a polarization type of a reference signal, an antenna element that sends the reference signal. In this way, positioning accuracy is improved.

According to the system provided in one embodiment of the present invention, the network device generates the specified quantity of reference signals based on the specified quantity of scrambling codes, where all the reference signals are scrambled by the different scrambling codes; and then sends the specified quantity of reference signals to the specified quantity of antenna elements. Each of the specified quantity of antenna elements performs, after receiving the specified quantity of reference signals, descrambling processing on the reference signal corresponding to the scrambling code of the antenna element, to obtain the specified reference signal; and sends the specified reference signal to the terminal device. Reference signals obtained by different antenna elements are different, so that the terminal device can identify which antenna element a received reference signal comes from. Therefore, an improved distributed antenna system can implement terminal device positioning, and improve indoor positioning accuracy.

Another embodiment of the present invention further provides a positioning system. The system includes a network device and a plurality of antenna elements. The network device is configured to: generate a reference signal, and send the reference signal to the plurality of antenna elements. Each of the plurality of antenna elements is configured to: perform, after receiving the reference signal, polarization processing on the reference signal using a specified polarization type, to obtain a plurality of reference signals of different polarization types; and send the plurality of reference signals to a terminal device.

According to the system provided in one embodiment, the network device sends the generated reference signal to the specified quantity of antenna elements; and each of the specified quantity of antenna elements performs, after receiving the reference signal, polarization processing on the reference signal using the specified polarization type, to obtain the specified reference signal; and sends the specified reference signal to the terminal device. Different antenna elements may use different polarization types to polarize reference signals, so that the terminal device can tell, based on a polarization type, which antenna element a received reference signal comes from. Therefore, an improved distributed antenna system can implement terminal device positioning, and improve indoor positioning accuracy.

Another embodiment of the present invention further provides an antenna element. As shown in FIG. 2, the antenna element includes a divider, a frequency mixing module, and an antenna.

The frequency mixing module is configured to: generate a specified local frequency; and perform, based on the specified local frequency after receiving a specified quantity of reference signals using the divider, frequency mixing processing on a reference signal carried on a carrier frequency corresponding to the antenna element, to obtain a specified reference signal, where the specified reference signal is sent by the antenna to a terminal device.

The antenna element provided in an embodiment of the present invention performs, after receiving the specified quantity of reference signals, frequency mixing processing on the reference signal carried on the carrier frequency corresponding to the antenna element, to obtain the specified reference signal; and sends the specified reference signal to the terminal device. An antenna element can obtain a reference signal on a carrier frequency corresponding to the antenna element, so that the terminal device can identify which antenna element a received reference signal comes from. Therefore, an improved distributed antenna system can implement terminal device positioning, and improve indoor positioning accuracy.

In another embodiment of the present invention, as shown in FIG. 4, the antenna element includes a divider, a descrambling module, and an antenna. The descrambling module is configured to: generate a specified scrambling code, and perform, based on the specified scrambling code after receiving a specified quantity of reference signals transmitted by the divider, descrambling processing on a reference signal corresponding to a scrambling code of the antenna element, to obtain a specified reference signal, where the specified reference signal is sent by the antenna to a terminal device.

According to the antenna element provided in an embodiment of the present invention, the descrambling module is configured to generate the specified scrambling code, and perform, based on the specified scrambling code after receiving the specified quantity of reference signals transmitted by the divider, descrambling processing on the reference signal corresponding to the scrambling code of the antenna element, to obtain a specified reference signal, where the specified reference signal is sent by the antenna to the terminal device. Reference signals obtained by different antenna elements are different, so that the terminal device can identify which antenna element a received reference signal comes from. Therefore, an improved distributed antenna system can implement terminal device positioning, and improve indoor positioning accuracy.

Another embodiment of the present invention further provides an antenna element. As shown in FIG. 6, the antenna element includes a polarization module and an antenna. The polarization module is configured to perform, after receiving a reference signal, polarization processing on the reference signal using a specified polarization type, to obtain a specified reference signal. The specified reference signal is sent by the antenna to a terminal device. Different antenna elements may use different polarization types to polarize reference signals, so that the terminal device can tell, based on a polarization type, which antenna element a received reference signal comes from. Therefore, an improved distributed antenna system can implement terminal device positioning, and improve indoor positioning accuracy.

Persons of ordinary skill in the art may understand that all or some of the operations of the embodiments may be implemented by hardware or a program instructing related hardware. The program may be stored in a computer-readable storage medium. The storage medium may include a read-only memory, a magnetic disk, an optical disc, or the like.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A terminal device, wherein the terminal device comprises a receiver, a transmitter, a processor, and a memory; the receiver, the transmitter, and the memory are each coupled to the processor; and the processor is configured to:
   obtain, based on auxiliary data configured by a network device, identifiers of at least two antenna elements and attribute information of a reference signal corresponding to each of the at least two antenna elements;
   receive at least two reference signals based on the attribute information, wherein the at least two reference signals are sent by corresponding antenna elements of the at least two antenna elements, respectively;
   obtain positioning information by measuring the at least two reference signals; and
   send, to the network device, the positioning information and identification information of antenna elements corresponding to the positioning information.

2. The terminal device according to claim 1, wherein the positioning information comprises a time difference of arrival, and the processor is configured to obtain a time difference of arrival between reference signals sent by each two antenna elements, of the at least two reference signals.

3. The terminal device according to claim 1, wherein the processor is configured to receive the auxiliary data sent by the network device.

* * * * *